Patented May 22, 1951

2,554,441

UNITED STATES PATENT OFFICE 2,554,441

HALOMETHYL ETHERS OF NUCLEAR ALKYLATED MONOARYL GLYCOL ETHERS

James M. Cross, Belvidere, and Raymond L. Mayhew, Phillipsburg, N. J., assignors to General Aniline & Film Corporation, New York, N. Y., a corporation of Delaware No Drawing. Application December 16, 1948, Serial No. 65,726

14 Claims. (Cl. 260—613)

This invention relates to novel halomethyl ethers of nuclear alkyl substituted monoaryl glycol ethers and a method of preparing the same.

It was known heretofore to prepare halomethyl ethers by reacting alcohols with an aldehyde and a hydrogen halide, as disclosed, for example, in U. S. P. 2,133,735. However, according to U. S. P. 2,266,737 and U. S. P. 2,291,528, when aryloxy alkylene glycol ethers are caused to react with formaldehyde or polymeric forms thereof and hydrogen halide, the resulting products are nuclear halomethyl substituted aryl ethers of alkylene glycols rather than the halomethyl ethers thereof. U. S. P. 2,395,336 and related patents list nuclear chloromethyl phenoxy ethanolchloromethyl ether as an intermediate starting material, although no method for its preparation is disclosed. This patent indicates that the halogen of the nuclear halomethyl group is more reactive (i. e., reacts at a lower temperature) with such compounds as amines to form tertiary amino and quaternary nitrogen compounds, than the halogen of the haloalkyl ether groups.

Thus, halomethyl ethers of monoaryl glycol ethers containing no halomethyl group or other reactive substituent in the aryl radical have not been prepared heretofore. Compounds of this type, wherein the aryl nucleus contains no reactive or water-solubilizing substituent, are valuable as intermediates in the preparation of cationic surface-active agents and water-repellent materials for textiles. For example, by reaction with tertiary nitrogent bases, these compounds yield quaternary nitrogen derivatives having superior surface-active properties by reason of the fact that only one water-solubilizing group is present at one end of an aliphatic chain, while the aryl radical, when suitably substituted, is available as a lipophilic radical. When textile materials are impregnated with the aforesaid quaternary nitrogen derivatives of the aforesaid compounds, and then subjected to a heat curing operation, the quaternary nitrogen radical at the end of the aliphatic chain is readily eliminated, leaving a highly water-repellent residue on the textile material, which withstands repeated dry cleaning and washing treatments. Quaternary nitrogen compounds containing a water-solubilizing group such as a quaternary nitrogen radical in the aryl nucleus as well as at the end of the aliphatic glycol chain, do not yield comparable water-repellent finishes on textiles by reason of the fact that solubilizing substituents of the aforesaid type in the aryl nucleus are not ordinarily removed by the curing treatment to which it is possible to subject the textile material.

The novel halomethyl ethers of this invention are also valuable as intermediates for the preparation of other useful compounds, for example, in the preparation of esters by reaction with salts of organic acids, and of acetals by reaction with alkali metal alkoxides.

The novel compounds of our invention have the following general formula:

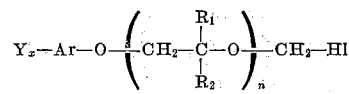

wherein Ar is an aromatic nucleus, preferably a phenyl nucleus, containing no water-solubilizing substituents such as sulfo or carboxy acid groups, or nuclear or side-chain quaternary nitrogen radicals, and no reactive substituents such as halomethyl groups, Y is a nuclear alkyl group, preferably having at least 3 carbon atoms, X is an integer from 1–3, the total number of carbon atoms in the radical $Y_x$ being preferably at least 8, and

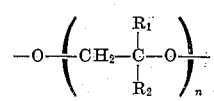

represents a glycol radical, i. e. a mono- or polyalkylene glycol radical, wherein $R_1$ and $R_2$ are members of the group consisting of hydrogen and lower alkyl groups (especially methyl groups), $n$ is an integer of the series 1, 2, 3 . . . , preferably 1–3, and Hl is a halogen atom, particularly chlorine or bromine.

While the aryl nucleus represented by Ar is preferably otherwise unsubstituted, it may contain unreactive substituents, such as chlorine or bromine; lower alkyl groups such as methyl or ethyl groups; or lower alkoxy groups such as methoxy or ethoxy groups.

The compounds of the invention are prepared from the corresponding monoalkylaryl ethers of alkylene or polyalkylene glycols, prepared, for example, by reaction of alkylphenols having the formula $Y_x$—Ar—OH with one or more molecules of alkylene oxides having the formula:

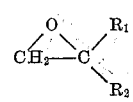

wherein $R_1$ and $R_2$, $Y_x$ and Ar have the same significance as in the formula set out above. Such alkylated monoaryl ethers of mono- or polyalkylene glycols are reacted with one mol of formaldehyde in monomeric or preferably polymeric form, e. g. paraformaldehyde, in the presence of a hydrogen halide, particularly HCl or HBr. The reaction is carried out in an inert organic solvent such as benzene, toluene, or carbon tetrachloride, in which the nuclear alkyl monoaryl glycol ether is dissolved together with 1–2 mols of formaldehyde or a polymer thereof, and passing gaseous hydrogen halide into the reaction mixture at room temperature (20°–30° C.) or elevated temperatures up to about 85° C., and preferably within the range 25–50° C. The halomethyl ether remains in the organic solvent, and the aqueous mixture of unreacted formaldehyde and hydrogen halide, formed in the reaction, can be removed therefrom by decantation. The hydrogen halide contained in the organic solvent fraction of the mixture can be removed by washing with a dilute aqueous alkaline solution, and the product can be recovered by evaporating the organic solvent, and if desired, purified by distillation under reduced pressure.

Preparation of a number of compounds in accordance with our invention is illustrated in the following examples, wherein parts and percentages are by weight.

Example 1

A stream of gaseous HCl is passed into a mixture of 145.6 parts of p-(2-methyl-butyl-2)-phenoxyethanol, 24 parts of paraformaldehyde, and 500 parts of benzene at 25–30° C. for a period of 6 hours. The reaction mixture is then stratified, and the benzene layer is separated from the aqueous layer which contains unreacted formaldehyde and hydrogen chloride. The organic layer is washed with dilute aqueous sodium carbonate solution until free from hydrochloric acid, and the benzene is removed by evaporation. The residue is then distilled under reduced pressure, whereby it yields a water white oil as the principal product having a boiling point of 150–155° C. at 2.5 mm. of Hg, containing 13.55% chlorine, as compared with a theoretical content of 13.4% for the chloromethyl ether of the alkylphenoxyethanol used as a starting material. The product is decomposed slowly on standing in contact with the atmosphere to form HCl, formaldehyde and the original alkylphenoxyethanol. Reaction with sodium ethoxide yields an ethyl-alkylphenoxyethyl acetal of formaldehyde, which is readily decomposed by dilute acids to the corresponding alcohols and formaldehyde. The reaction product therefore has the following formula:

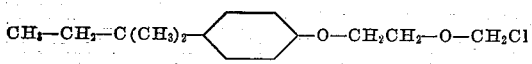

By substituting, for the p-(2-methyl-butytl-2)-phenoxyethanol, an equivalent quantity of p-(2,4,4-trimethylamyl-2)-phenoxyethanol, in the procedure above described, a product having the following formula is obtained:

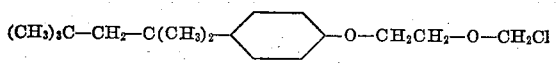

upon evaporation of the benzene employed as a reaction medium, after separation from the aqueous fraction of the reaction mixture.

Example 2

A stream of gaseous HCl is passed into a mixture of 278 parts of 2,4-diamylphenol, 35 parts of paraformaldehyde and 1000 parts of benzene at a temperature of 35–40° C. for 10 hours. After separation of the aqueous layer of the reaction mixture, the benzene layer is washed with ice water and then with dilute aqueous sodium carbonate solution. Upon evaporating the benzene under reduced pressure, a clear brown oil remains as a residue, having a chlorine content corresponding to one chloromethyl group. An essentially quantitative yield is obtained. The product has the following formula:

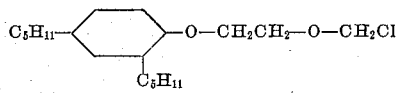

Example 3

A stream of dry, gaseous hydrogen chloride is passed into a vigorously agitated mixture of 122.4 parts of dodecylphenoxyethanol, 14.0 parts of paraformaldehyde and 400 parts of benzene, at a temperature of 30–35° C. for 8 hours. After allowing the mixture to stratify, the lower layer, consisting mainly of water, unreacted formaldehyde and hydrogen chloride, is separated, and the benzene layer is washed thoroughly with ice water. Upon evaporating the benzene under reduced pressure, a light brown oil remains as a residue, having the following formula:

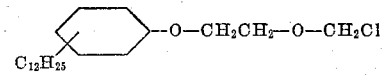

Example 4

Dry, gaseous HCl is passed into a vigorously agitated mixture of 78.0 parts of octadecylphenoxyethanol, 8.0 parts of paraformaldehyde and 200 parts of benzene, at a temperature of 25–30° C. for 7 hours. After separating the aqueous layer containing unreacted formaldehyde and hydrogen chloride, the remaining benzene layer is washed thoroughly with ice water and evaporated under reduced pressure as in the preceding example. A light brown oil remains as a residue, having the formula:

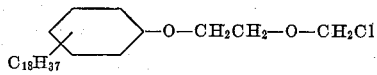

The product is found to contain 8.1% chlorine as compared with the theoretical value of 7.80% for the formula given above.

Example 5

A stream of dry, gaseous HCl is passed into a mixture of 112.8 parts of dodecylphenoxyethoxyethanol, 300 parts of benzene, and 13.0 parts of paraformaldehyde at room temperature (25–30° C.) for 6 hours. The resulting product is recovered from the reaction mixture in a manner similar to that described in the preceding example. 122 parts of a light brown viscous material is obtained having the following formula:

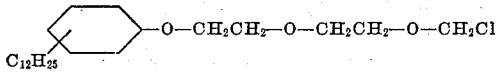

Example 6

A stream of dry, gaseous HCl is passed into an agitated mixture of 105.6 parts of 2,4,6-triisopropylphenoxyethanol, 15.0 parts of paraformaldehyde and 400 parts of benzene, at room temperature (25–30° C.) for 6 hours. The resulting product is recovered from the reaction mixture in the same manner as in Example 4, yielding a light brown oil having the following formula:

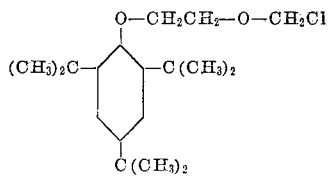

*Example 7*

Gaseous HCl is passed into a mixture of 102 parts of 1 - (octadecylphenoxy) - 2 - propanol, 10 parts of paraformaldehyde, and 240 parts of benzene, while heating the latter to boiling temperature under reflux for 10 hours. Water formed during the reaction is removed from the reflux condensate during the reaction. A total of 7.5 parts of water is collected. The benzene solution remaining in the reaction apparatus is washed three times with water, and the benzene is removed by distillation under reduced pressure at 40–45° C. A light brown oil remains as a residue, having a chlorine content of 7.32%, as compared with a theoretical chlorine content of 7.90%. The product has the following formula:

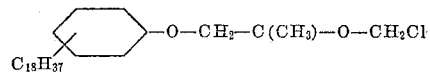

As indicated by the analytical results of Example 1, only one halomethyl group is introduced into the molecule. The fact that the halomethyl group is present as an ether at the end of the glycol chain rather than as a nuclear substituent in the aryl radical is shown by the fact that it forms an acetal with sodium ethoxide which can be readily decomposed to the original alcohols and formaldehyde by dilute acids. Had the halomethyl group entered the aryl nucleus, the product of the reaction with sodium alkoxide would be an aralkyethyl ether which could not be readily decomposed to yield formaldehyde, nor to form the original alkylphenoxyethanol. The fact that the halomethyl group enters the molecule in the form of an ether at the end of the glycol chain is further substantiated by the fact that a halomethyl derivative is obtained from the 2,4,6-trialkylphenoxyethanol of Example 6, wherein all of the reactive nuclear positions of the phenoxyethanol are blocked against substitution by halomethyl groups by the presence of the isopropyl groups therein.

The observation that the halomethyl group forms an ether rather than entering the aryl nucleus as a nuclear substituent in compounds of the type herein employed as starting materials, namely, alkylated monoaryl ethers of glycols, is surprising in that the glycol ether radical would have been expected to activate unoccupied ortho- or para-positions in the aryl nucleus so as to facilitate substitution of a halomethyl group in one of these activated positions.

Instead of the nuclear alkylated phenyl ethers of mono- and dioxyalkylene glycols employed as starting materials in the foregoing examples, similar products are obtained when equivalent amounts of such ethers are employed in which other aryl radicals replace the phenyl radical, e. g. naphthyl, biphenyl, and similar aromatic nuclei. The alkyl substituents represented by Y in the general formula given above generally occupy the ortho- and para-positions relative to the glycol radicals, and preferably contain at least 3 carbon atoms. More particularly, those compounds are preferred in which the total number of carbon atoms in the alkyl groups is at least 8, especially when contained in a single alkyl group, as exemplified by the octyl compound mentioned in Example 1, and the dodecyl and octadecyl compounds illustrated in Examples 3, 4, 5 and 7. The dodecyl and octadecyl radicals of the products of Examples 3, 4, 5 and 7 correspond to the alcohols obtained by catalytic reduction of fatty acids occurring in natural fats.

The aryl radical is preferably otherwise unsubstituted, but may contain unreactive non-water-solubilizing substituents such as chlorine, bromine or lower alkyl groups.

The glycol radical represented in the general formula by

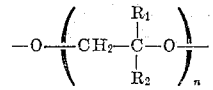

contains a number of oxyalkylene radicals which depends on the number of mols of alkylene oxide employed for reaction with 1 mol of the corresponding phenol in the preparation of the starting material. Preferably, the glycol radical contains 1–3 oxyalkylene groups of the structure represented in the general formula. These oxyalkylene radicals are oxyethylene groups or lower homologues thereof in which one of the carbon atoms may contain 1–2 methyl groups as substituents.

In carrying out the preparation of the halomethyl ethers of this invention, hydrogen bromide can replace hydrogen chloride, whereby the corresponding bromomethyl ether is obtained instead of the chloromethyl ether illustrated in the foregoing examples. Formaldehyde can be used as such, but is preferably employed in the form of a polymer such as paraformaldehyde, which yields monomeric formaldehyde under the conditions of the reaction as illustrated in the examples. The amount of formaldehyde employed preferably corresponds to 15–50% in excess of 1 mol per mol of the alkyl substituted monoaryl glycol ether. In general, suitable amounts of formaldehyde are between 1 and 2 mols per mol of the aryl glycol ether. If smaller than equimolecular amounts of formaldehyde are employed, correspondingly lower yields of the halomethyl ether are obtained. The reaction temperature is preferably between 25 and 50° C., although room temperatures of 20° C. and elevated temperatures up to about 85° C. can be used. The reaction is generally complete in 5–10 hours. Separation and recovery of the final product contained in the reaction mixture can be effected by any convenient method, involving, for example, separation of the aqueous portion of the reaction mixture by decantation, removal of hydrogen halide if present in excessive amounts in the organic solvent fraction of the reaction mixture, and evaporating the solvent. If desired, the final product may be purified by distillation under vacuo.

The halomethyl ethers obtained in accordance with this invention can be utilized as intermediates in the preparation of acetals as illustrated in Example 1, by reaction with alkali metal alkoxides. Similar reaction with organic acid salts yields ethers of the organic acids. By reaction with tertiary amines, quaternary nitrogen compounds are obtained which are soluble or colloidally dispersable in water to form solutions having wetting, dispersing, and/or emulsifying properties, depending on the molecular weight of the product employed. Quaternary compounds thus obtained can also be applied for rendering textiles water-repellent by impregnating the material therewith, and heating at temperatures, e. g. of 120–160° C., to decompose or eliminate the quaternary nitrogen radical. Preparation of such quaternary nitrogen compounds forms the subject matter of our copending application Serial No. 65,725, filed December 16, 1948.

Variations and modifications which will be obvious to those skilled in the art can be made in the foregoing procedures and starting materials without departing from the scope or spirit of the invention.

We claim:

1. A halomethyl ether of a nuclear alkyl substituted monoaryl glycol ether having the following formula:

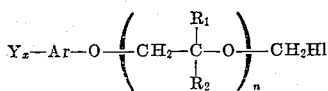

wherein Ar is an aryl nucleus, Y is a nuclear alkyl group, $x$ is an integer from 1 to 3, the remaining positions of said aryl radical being occupied by members of the group consisting of hydrogen, chlorine and bromine, and

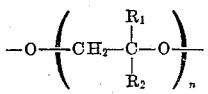

is a glycol radical, wherein $R_1$ and $R_2$ are members of the group consisting of hydrogen and lower alkyl groups, and $n$ is an integer, at least 1; and Hl is a member of the group consisting of chlorine and bromine.

2. A chloromethyl ether of a nuclear alkyl substituted monophenyl glycol ether, having 1–3 nuclear alkyl groups, each containing at least 3 carbon atoms and together containing at least 8 carbon atoms, wherein the phenyl nucleus has no additional nuclear substituents; and the glycol radical consists of a chain of 1–3 oxyalkylene groups.

3. A chloromethyl ether of a nuclear alkyl substituted monophenyl glycol ether having 1–3 nuclear alkyl groups of which at least one contains at least 8 carbon atoms, the phenyl nucleus having no additional nuclear substituents, and wherein the glycol radical consists of a chain of 1–3 oxyalkylene groups.

4. A chloromethyl ether of a nuclear monoalkyl substituted monophenyl glycol ether, wherein the alkyl group is the radical of an alcohol corresponding to a fatty acid occurring in natural fats, wherein the phenyl nucleus contains no additional substituents, and wherein the glycol radical consists of a single oxyalkylene group of 2–3 carbon atoms.

5. A chloromethyl ether of a nuclear alkyl substituted monophenyl glycol ether having the following formula:

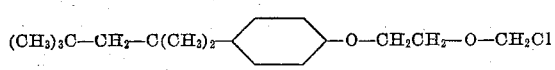

6. A chloromethyl ether of a nuclear alkyl substituted monophenyl glycol ether having the following formula:

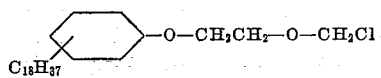

7. A chloromethyl ether of a nuclear alkyl substituted monophenyl glycol ether having the following formula:

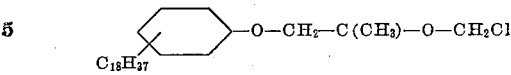

8. A process for preparing a halomethyl ether of a nuclear alkyl substituted monoaryl glycol ether, which comprises passing hydrogen halide into an inert organic solvent solution, at a temperature of 20–85° C., of formaldehyde and a nuclear alkyl substituted aryl glycol ether having the formula:

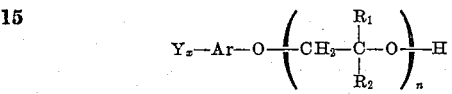

wherein Ar is an aryl nucleus, Y is a nuclear alkyl group, $x$ is an integer from 1 to 3, the remaining positions of said aryl radical being occupied by members of the group consisting of hydrogen, chlorine and bromine, and

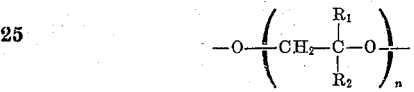

is a glycol radical, wherein $R_1$ and $R_2$ are members of the group consisting of hydrogen and lower alkyl groups, and $n$ is an integer, at least 1, the mol ratio of formaldehyde to said glycol ether being between 1:1 and 2:1.

9. A process for preparing a chloromethyl ether of a nuclear alkyl substituted monophenyl glycol ether, which comprises passing gaseous hydrogen chloride into an inert organic solvent solution, at a temperature of 20–85° C., of formaldehyde and a nuclear alkyl substituted monophenyl glycol ether having from 1 to 3 nuclear alkyl groups, each containing at least 3 carbon atoms and together containing at least 8 carbon atoms, wherein the phenyl nucleus has no additional substituents; and the glycol radical consists of a chain of 1 to 3 oxyalkylene groups, the mol ratio of formaldehyde to said glycol ether being between 1:1 and 2:1.

10. A process for preparing a chloromethyl ether of a nuclear alkyl substituted monophenyl glycol ether, which comprises passing gaseous hydrogen chloride into an inert organic solvent solution, at a temperature of 20–85° C., of formaldehyde and a nuclear alkyl substituted monophenyl glycol ether having from 1 to 3 nuclear alkyl groups of which at least one contains at least 8 carbon atoms, wherein the phenyl nucleus has no additional substituents; and the glycol radical consists of a chain of 1 to 3 oxyalkylene groups, the mol ratio of formaldehyde to said glycol ether being between 1:1 and 2:1.

11. A process for preparing a chloromethyl ether of a nuclear alkyl substituted monophenyl glycol ether, which comprises passing gaseous hydrogen chloride into an inert organic solvent solution, at a temperature of 20–85° C., of formaldehyde and a nuclear monoalkyl substituted monophenyl glycol ether, wherein the alkyl group is a radical of an alcohol corresponding to the fatty acid of a natural fat, wherein the phenyl nucleus has no additional nuclear substituents, and the glycol radical consists of a single oxyalkylene group of from 2 to 3 carbon atoms, the mol ratio of formaldehyde to said glycol ether being between 1:1 and 2:1.

12. A process for preparing a chloromethyl ether of a nuclear alkyl substituted monophenyl glycol ether, which comprises passing gaseous hydrogen chloride into an inert organic solvent solution, at a temperature of 25-50° C., of paraformaldehyde and a compound having the following formula:

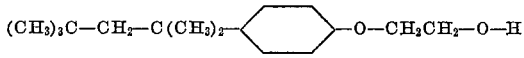

the mol ration of formaldehyde to said compound being between 1:1 and 1.5:1.

13. A process for preparing a chloromethyl ether of a nuclear alkyl substituted monophenyl glycol ether, which comprises passing gaseous hydrogen chloride into an inert solvent solution, at a temperature of 25-50° C., of paraformaldehyde and a compound having the following formula:

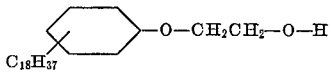

the mol ratio of formaldehyde to said compound being between 1:1 and 1.5:1.

14. A process for preparing a chloromethyl ether of a nuclear alkyl substituted monophenyl glycol ether, which comprises passing gaseous hydrogen chloride into an inert solvent solution, at a temperature of 20-85° C., of paraformaldehyde and a compound having the following formula:

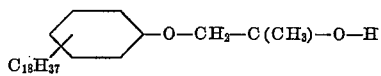

the mol ratio of formaldehyde to said compound being between 1:1 and 1.5:1.

JAMES M. CROSS.
RAYMOND L. MAYHEW.

REFERENCES CITED

The following references are of record in the file of this patent:

UNITED STATES PATENTS

| Number | Name | Date |
| --- | --- | --- |
| 2,213,477 | Steindorf | Sept. 3, 1940 |
| 2,229,024 | Bruson | Jan. 21, 1941 |
| 2,266,737 | Bruson | Dec. 23, 1941 |
| 2,290,462 | Allen | July 21, 1942 |
| 2,291,528 | Bruson | July 28, 1942 |